United States Patent
Monconduit et al.

(10) Patent No.: US 10,326,130 B2
(45) Date of Patent: Jun. 18, 2019

(54) USE OF NOVEL COMPOUNDS AS NEGATIVE ELECTRODE ACTIVE MATERIAL IN A SODIUM-ION BATTERY

(71) Applicants: CENTRE NATIONAL DE LA RECHERCHE SCIENTIFIQUE, Paris (FR); UNIVERSITE MONTPELLIER II SCIENCES ET TECHNIQUES, Montpellier (FR)

(72) Inventors: Laure Monconduit, Jacou (FR); Ali Darwiche, Montpellier (FR); Julien Fullenwarth, Le Cres (FR); Lorenzo Stievano, Montpeyroux (FR); Moulay Tahar Sougrati, Montpellier (FR)

(73) Assignees: CENTRE NATIONAL DE LA RECHERCHE SCIENTIFIQUE, Paris (FR); UNIVERSITE DE MONTPELLIER, Montpellier (FR)

( * ) Notice: Subject to any disclaimer, the term of this patent is extended or adjusted under 35 U.S.C. 154(b) by 157 days.

(21) Appl. No.: 14/897,255

(22) PCT Filed: Jun. 16, 2014

(86) PCT No.: PCT/FR2014/051480
§ 371 (c)(1),
(2) Date: Dec. 10, 2015

(87) PCT Pub. No.: WO2014/202887
PCT Pub. Date: Dec. 24, 2014

(65) Prior Publication Data
US 2016/0141611 A1 May 19, 2016

(30) Foreign Application Priority Data
Jun. 17, 2013 (FR) ...................... 13 55641

(51) Int. Cl.
*H01M 4/38* (2006.01)
*C01G 30/00* (2006.01)
(Continued)

(52) U.S. Cl.
CPC .............. *H01M 4/38* (2013.01); *C01G 30/00* (2013.01); *C01G 49/00* (2013.01); *C01G 49/009* (2013.01);
(Continued)

(58) Field of Classification Search
None
See application file for complete search history.

(56) References Cited

U.S. PATENT DOCUMENTS

2001/0005561 A1* 6/2001 Yamada .............. H01M 2/1066
429/152
2001/0033973 A1* 10/2001 Krause .................... H01M 4/13
429/232

(Continued)

FOREIGN PATENT DOCUMENTS

| CN | 101662017 | 3/2010 |
| CN | 102544462 | 7/2012 |

(Continued)

OTHER PUBLICATIONS

Machine Translation of Japanese Patent Publication 2013-054987.*
(Continued)

*Primary Examiner* — Wyatt P McConnell
(74) *Attorney, Agent, or Firm* — W&C IP

(57) ABSTRACT

Precursor compounds of sodium alloy(s), for use as negative electrode active material in a sodium-ion battery, as well as to a negative electrode have the precursor compound of sodium alloy(s), as well as a sodium-ion battery having a negative electrode of this kind.

9 Claims, 8 Drawing Sheets

(51) Int. Cl.
| | |
|---|---|
| H01M 4/134 | (2010.01) |
| H01M 4/136 | (2010.01) |
| H01M 4/58 | (2010.01) |
| H01M 10/054 | (2010.01) |
| C01G 49/00 | (2006.01) |
| C01G 51/00 | (2006.01) |
| C01G 53/00 | (2006.01) |
| C22C 13/00 | (2006.01) |
| H01M 4/62 | (2006.01) |
| C01B 25/08 | (2006.01) |

(52) U.S. Cl.
 CPC .......... *C01G 51/00* (2013.01); *C01G 51/006* (2013.01); *C01G 53/00* (2013.01); *C01G 53/006* (2013.01); *C22C 13/00* (2013.01); *H01M 4/134* (2013.01); *H01M 4/136* (2013.01); *H01M 4/58* (2013.01); *H01M 4/623* (2013.01); *H01M 4/625* (2013.01); *H01M 10/054* (2013.01); *C01B 25/08* (2013.01); *H01M 2220/20* (2013.01); *H01M 2220/30* (2013.01)

(56) References Cited

U.S. PATENT DOCUMENTS

| | | | | |
|---|---|---|---|---|
| 2005/0271916 | A1* | 12/2005 | Yang | C01B 3/0005 429/421 |
| 2008/0026289 | A1 | 1/2008 | Masahara et al. | |
| 2012/0094178 | A1* | 4/2012 | Loveridge | H01M 4/134 429/217 |
| 2013/0052525 | A1* | 2/2013 | Kageura | H01M 4/133 429/200 |
| 2013/0266858 | A1* | 10/2013 | Inoue | H01G 11/50 429/211 |
| 2013/0323585 | A1* | 12/2013 | Inoue | H01G 11/68 429/211 |
| 2015/0303467 | A1* | 10/2015 | Obrovac | H01M 4/13 429/188 |

FOREIGN PATENT DOCUMENTS

| | | |
|---|---|---|
| JP | 2007123236 | 5/2007 |
| JP | 2013054987 | 3/2013 |
| JP | 2013084522 | 5/2013 |
| WO | 2013/015321 A1 | 1/2013 |

OTHER PUBLICATIONS

Xie J et al.: "Solvothermal synthesis and electrochemical performances of nanosized CoSb3 as anode materials for Li-ion batteries" dated: Feb. 2, 2005.

Y. Lu et al.: "Growth of nickel phosphide films as anodes for lithium-ion batteries: based on a novel method for of synthesis nickel films using ionic liquids" dated: Dec. 1, 2013.

Darwiche et al.: "Facile synthesis and long cycle life of SnSb as negative electrode material for Na-ion batteries" dated: Mar. 28, 2013.

Hayashi et al.: "Electrochemical performance of NiP2 negative electrodes in all-solid-state lithium secondary batteries" dated: Apr. 1, 2009.

Search Report dated 2014.

* cited by examiner

USE OF NOVEL COMPOUNDS AS NEGATIVE ELECTRODE ACTIVE MATERIAL IN A SODIUM-ION BATTERY

RELATED APPLICATIONS

This application is a National Phase Application of PCT/FR2014/051480, filed on Jun. 14, 2014, which in turn claims the benefit of priority from French Patent Application No. 13 55641 filed on Jun. 17, 2013, the entirety of which are incorporated herein by reference,

BACKGROUND

Field of the Invention

The present invention relates to the use of novel compounds that are precursors of sodium alloy(s), as a negative electrode active material in a sodium-ion battery as well as a negative electrode comprising said precursor compound of sodium alloy(s), and a sodium-ion battery comprising a negative electrode of this kind.

Technological Background

Lithium batteries have become indispensable constituents in most portable electronic devices and they are widely researched for use in electric vehicles as well as in the field of energy storage. However, their future risks being compromised, on the one hand because lithium resources are limited and on the other hand because the cost of the lithium-based raw materials has almost doubled from the time when they were first used in 1991 until today, and is still rising owing to the increasing global demand for lithium-ion accumulators. Thus, although recyclable lithium batteries are beginning to be proposed, sodium-ion batteries could constitute an alternative solution of choice and replace lithium batteries, notably owing to the greater availability of the precursors of sodium in nature (earth's crust, seawater, etc.) and their low cost.

Sodium batteries generally have a cathode in which the active material is a compound capable of inserting sodium ions reversibly, an electrolyte comprising an easily dissociable sodium salt, and an anode whose active material is a sheet of sodium $Na^0$ or of a sodium alloy, or a compound capable of inserting sodium ions reversibly at a potential lower than that of the active material of the cathode.

The various constituents of a sodium battery are selected so as to produce, at the lowest possible cost, batteries that have a high energy density, good cycling stability and safe operation.

The use of sodium in Na/S batteries that operate at a high temperature for storage of the order of a megawatt is known. Na/NiCl$_2$ systems for electric vehicles are also known. However, these two types of batteries (ZEBRA® batteries) only operate in a high temperature range (of the order of 270-300° C.), where they have the benefit of the high conductivity of β-alumina ceramics.

Although most of the research conducted recently has focused on the design of positive electrodes for sodium-ion batteries, negative electrodes based on carbon-containing materials other than graphite have also been proposed. In fact, it is known that graphite has poor sodium insertion properties, notably on account of the fact that sodium has an ionic radius about 55% greater than that of lithium, rendering its intercalation in certain anode materials difficult. Thus, Komaba et al. [*Adv. Funct. Mater.*, 2011, 21, 20, 3859-3867] proposed the use of "hard" carbon (carbon containing predominantly sp$^2$ carbon atoms) as anode active material in a sodium-ion battery. Absorption of the sodium ions on the surfaces of the nanopores of "hard" carbon facilitates their insertion and makes it possible to obtain specific capacities of the order of 250 mAh/g. However, the main drawback of "hard" carbons is consumption of a portion of the current, and therefore of the sodium ions derived from the positive electrode during the first charge, resulting in the formation of a protective "passivation" layer on the negative electrode, which prevents subsequent reaction of the electrolyte on the negative electrode, into which sodium will be inserted. This phenomenon causes a decrease in the battery's energy density and a loss of the initial capacity of from 15 to 25% in the first cycle.

Very recently, Darwiche et al. [*J. Am. Chem. Soc.*, 2012, 134, 20805-20811] showed that pure antimony Sb of micrometric size can also be used as the anode active material in a sodium-ion battery to achieve good electrochemical performance, even better than that obtained in a lithium-ion battery. In fact, the initial specific capacity in a sodium-ion battery is 600 mAh/g and it is maintained for 160 cycles, whereas in a lithium-ion battery the initial specific capacity is about 640 mAh/g and it decreases sharply after 15 cycles. However, antimony has the drawbacks of being, on the one hand, a very toxic element and, on the other hand, a non-renewable resource that will disappear owing to intensive human exploitation. In fact, exhaustion of antimony should be definitive from 2022.

Darwiche et al. [*Electrochem. Comm.*, 2013, 32, 18-21] also described that the use of SnSb as anode active material in a sodium-ion battery makes it possible to achieve good electrochemical performance in terms of specific capacity and cycling stability (specific capacity of 525 mAh/g maintained for 125 cycles). However, antimony has the aforementioned drawbacks and tin is, like antimony, a non-renewable resource that will disappear owing to intensive human exploitation. In fact, exhaustion of tin should be definitive around 2028.

THE PRESENT INVENTION

The aim of the present invention is to overcome the aforementioned drawbacks partly or completely, by proposing the use of novel precursor compounds of sodium alloys as anode active material in a sodium battery, leading to good electrochemical performance in safe conditions. In particular, the present invention has the aim of using, in a sodium-ion battery, novel precursor compounds of sodium alloys that are less toxic for the environment than those of the prior art, are potentially recyclable and comprise smaller amounts of elements that are destined to disappear in the course of the next decade.

For this purpose, the present invention relates to the use of a novel precursor compound of sodium alloy(s), corresponding to the following formula:

$$M_n E1_x E2 \qquad (I)$$

in which:

M is a transition metal selected from Co, Ni, Cu and Fe;
E1 and E2 are elements selected from In, Bi, Ge, Sn, Sb and P;
the values of n and x are such that the compound of formula (I) is electronically neutral;
with the following conditions:
when n=0 and x=0, E2 is In;
when n=0 and x≠0, E1 and E2 are different from one another and are selected from In, Bi, Ge, Sn, Sb and P, with x such that 0.1≤x≤2, preferably 0.1≤x≤0.5, and more preferably 0.2≤x≤0.5; it being understood that when x=1 and E1 (respectively E2) is Sn, E2 (respectively E1) is different from Sb;

when n≠0, x=0, and E2 is selected from In, Bi, Ge, Sn, Sb and P, with n such that 0.1≤n≤3, preferably 0.1≤n≤0.5, and more preferably 0.2≤n≤0.5; it being understood that when n=2 and M is Cu, E2 is different from Sb, and when n=6/5 and M is Cu, E2 is different from Sn;

as negative electrode active material in a sodium-ion battery.

In the present invention, when n=0 and x≠0, or when n≠0 and x=0, the compound corresponding to the formula $E1_xE2$ or $M_nE2$ is in the form of an alloy, i.e. it constitutes a compound as such and not a simple mixture of E1 and E2, or of M and E2, In a preferred embodiment of the invention, M is selected from Co, Ni and Fe.

The applicant discovered that these compounds of formula (I), precursors of sodium alloy(s), can be used as anode active material in a sodium-ion battery and lead to excellent electrochemical performance, in terms of initial specific capacity, cycling stability and coulombic efficiency, said performance being equivalent, or even better than that obtained using the same compounds of formula (I) as anode active material in a lithium-ion battery. This result is surprising, bearing in mind that as the sodium atom is much larger than the lithium atom, we might expect its insertion in the active material to generate a far greater volume expansion during cycling, i.e. during formation of the alloy with highest sodium content, than is generated by the insertion of lithium, and on this basis should lead to a deterioration of the electrochemical performance. Against all expectation, however, it was found that the passage of each of the compounds of formula (I) used according to the invention, to the alloy with the highest sodium content during cycling, induces a very large volume expansion, of the order of about 400 to 550%, and that the electrochemical properties remain unaffected by this; whereas this phenomenon of volume expansion, which is also observed with silicon electrodes submitted to cycles of charging and discharging with respect to the lithium ions, leads to a substantial reduction in electrochemical performance of the battery.

Moreover, the use of these compounds of formula (I) in a sodium-ion battery rather than in a lithium-ion battery makes it possible to avoid, partly or completely, the degradation of the electrolyte at the surface of the electrode, notably owing to the fact that the potential of the $Na^+/Na$ couple is higher than the potential of the $Li^+/Li$ couple.

Moreover, the presence, in the compounds of formula (I), of a transition metal M or of an element E1 when the element E2 is antimony or tin, makes it possible to decrease the amounts of said antimony and tin used in said compounds of formula (I).

Finally, the compounds of formula (I) comprising a transition metal M display better electron conduction, notably during battery charging.

When the compound of formula (I) comprises a transition metal M and an element E2 or comprises both elements E1 and E2 but no metal M, said compound may be obtained by methods familiar to a person skilled in the art by reaction of M and E2 or of E1 and E2 in the form of powders either in a grinding mill (mechanosynthesis), or in a sealed tube under vacuum at high temperature. As is described in detail in the examples given below that illustrate the invention, these syntheses require, however, suitable reaction conditions so as to be able to form the compound of formula (I) as such, i.e. the compound of formula $M_nE2$ or $E1_xE2$ in the form of alloy.

Thus, a method such as that described in CN 102544462 comprising a step of mixing a powder of tin or of antimony, and an iron powder; and a step of grinding for several hours, does not give an alloy of type $Fe_nSn$ or $Fe_nSb$, with 0.1≤n≤3. In fact, either the mixture in the first step further comprises a carbon-containing agent (e.g. acetylene black), preventing the formation of said alloy of type $Fe_nSb$ or $Fe_nSb$ during the grinding step; or the duration of grinding and/or the pauses during grinding are unsuitable for allowing the alloys to form, notably in the case of tin. In fact, tin melts at low temperature (232°C.), and therefore before the alloy is able to form, causing agglomeration of tin particles on the walls of the grinding mill.

When the compound of formula (I) comprises only an element E2, said compound may be used directly in the form of powder as received from the manufacturers, or may be ground in a grinding mill.

According to a first variant, the compound used according to the invention corresponds to the following formula (Ia):

$$M_nE1_xP \tag{Ia}$$

in which:

M is a transition metal selected from Co, Cu, Ni and Fe;
E1 is an element selected from In, Bi, Ge, Sn and Sb;
the values of n and x are such that the compound of formula (Ia) is electronically neutral;
with the following conditions:
when n=0 and x≠0, x is such that 0.1≤x≤1, preferably such that 0.1≤x≤0.5, and more preferably such that 0.2≤x≤0.5;
when n≠0 and x=0, n is such that 0.1≤n≤3, preferably such that 0.1≤n≤0.5, and more preferably such that 0.2≤n≤0.5.

Phosphorus being a light element, its presence in the compounds of formula (Ia) makes it possible to supply anode active materials that can reach high mass capacities in a sodium-ion battery.

In the context of this first variant, it will be preferred advantageously to use the compounds selected from $SnP_3$ (which corresponds to a compound of formula (Ia) with n=0 and x=1/3), $CuP_2$ (which corresponds to a compound of formula (Ia) with x=0 and n=1/2), $CoP_3$ (which corresponds to a compound of formula (Ia) with x=0 and n=1/3), and $NiP_3$ (which corresponds to a compound of formula (Ia) with x=0 and n=1/3).

In a preferred embodiment, M is selected from Co, Ni and Fe.

According to a second variant, the compound used according to the invention corresponds to the following formula (Ib):

$$M_nE1_xSb \tag{Ib}$$

in which:

M is a transition metal selected from Co, Cu, Ni and Fe;
E1 is an element selected from In, Bi, Ge, Sn and P;
the values of n and x are such that the compound of formula (Ib) is electronically neutral;
with the following conditions:
when n=0 and x≠0, x is such that 0.1≤x≤1, preferably such that 0.1≤x≤0.5, and more preferably such that 0.2≤x≤0.5;
when n≠0 and x=0, n is such that 0.1≤n≤3, preferably such that 0.1≤n≤0.5, and more preferably such that 0.2≤n≤0.5.

The antimonides of formula (Ib) used according to the invention have reduced amounts of antimony awing to the presence of the transition metal M or of the element E1.

They therefore have reduced toxicity compared to pure antimony. Moreover, said antimonides of formula (Ib) are very dense (densities between 6 and 8) and thus allow high volume capacities to be reached in a sodium-ion battery.

In a preferred embodiment, M is selected from Co, Ni and Fe.

In the context of this second variant, it will be preferred advantageously to use the compounds selected from $CoSb_3$ (which corresponds to a compound of formula (Ib) with n=1/3 and x=0), $NiSb_2$ (which corresponds to a compound of formula (Ib) with n=1/2 and x=0) and $FeSb_2$ (which corresponds to a compound of formula (Ib) with n=1/2 and x=0).

In a particular embodiment of this second variant, the compound used according to the invention as negative electrode active material in a sodium-ion battery corresponds to the following formula (Ib-1):

$$Bi_xSb \qquad (Ib\text{-}1)$$

in which:
the value of x is such that the compound of formula (Ib-1) is electronically neutral;
x is such that $0.1 \leq x \leq 1$ and even more preferably, x is such that $0.2 \leq x \leq 0.4$.

The compounds of formula (Ib-1) used according to the invention have reduced amounts of antimony owing to the presence of bismuth.

According to a third variant, the compound used according to the invention as active material in a sodium-ion battery is SnGe.

The invention also relates to a negative electrode for a sodium-ion battery comprising:
(i) about 45 to 75% of an active material corresponding to the following formula:

$$M_nE1_xE2 \qquad (I)$$

in which:
M is a transition metal selected from Co, Cu, Ni and Fe;
E1 and E2 are elements selected from In, Bi, Ge, Sn, Sb and P;
the values of n and x are such that the compound of formula (I) is electronically neutral;
with the following conditions:
when n=0 and x=0, E2 is In;
when n=0 and x≠0, E1 and E2 are different from one another and are selected from In, Bi, Ge, Sn, Sb and P, with x such that $0.1 \leq x \leq 2$, preferably $0.1 \leq x \leq 0.5$, and more preferably such that $0.2 \leq x \leq 0.5$; it being understood that when x=1. and E1 (respectively E2) is Sn, E2 (respectively E1) is different from Sb;
when n≠0, x=0, and E2 is selected from In, Bi, Ge, Sn, Sb and P, with n such that $0.1 \leq n \leq 3$, preferably $0.1 \leq n \leq 0.5$, and more preferably such that $0.2 \leq n \leq 0.5$; it being understood that when n=2 and M is Cu, E2 is different from Sb, and when n=6/5 and M is Cu, E2 is different from Sn.
(ii) about 0 to 30% of a binder and
(iii) about 0 to 30% of an agent conferring electron conductivity,
the percentages being expressed by weight relative to the total weight of the electrode.

In a preferred embodiment, M is selected from Co, Ni and Fe.

In a particular embodiment, the negative electrode according to the invention comprises:
(i) about 55 to 75% of active material corresponding to formula (I) as defined above,
(ii) about 10 to 25% of a binder,
(iii) about 15 to 25% of an agent conferring electron conductivity.

According to this particular embodiment, the active material may correspond to formula (Ia), (Ib), or (Ib-1), said formulae (Ia), (Ib) and (Ib-1) being as defined in the present invention.

In a particular embodiment, the negative electrode according to the invention comprises:
(i) about 60 to 67% of an active material corresponding to the following formula:

$$M_nE1_xP \qquad (Ia)$$

in which:
M is a transition metal selected from Co, Cu, Ni and Fe;
E1 is an element selected from In, Bi, Ge, Sn and Sb;
the values of n and x are such that the compound of formula (Ia) is electronically neutral;
with the following conditions:
when n=0 and x≠0, x is such that $0.1 \leq x \leq 1$, preferably such that $0.1 \leq x \leq 0.5$, and more preferably such that $0.2 \leq x \leq 0.5$;
when n≠0 and x=0, n is such that $0.1 \leq n \leq 3$, preferably such that $0.1 \leq n \leq 0.5$, and more preferably such that $0.2 \leq n \leq 0.5$.
(ii) about 12 to 20% of a binder,
(iii) about 18 to 25% of an agent conferring electron conductivity.

In a preferred embodiment of the invention, M is selected from Co, Ni and Fe.

The binders usable according to the invention are preferably selected from carboxymethylcellulose (CMC), polyvinylidene fluoride (PVDF), styrene/butadiene copolymer (SBR) and mixtures thereof. Among these binders, CMC and PVDF are particularly preferred.

The agents conferring electron conductivity usable according to the invention are preferably selected from carbon black, vapour grown carbon fibres (VGCF-S), carbon nanotubes, carbon SP and mixtures thereof. Among said agents, carbon black and vapour grown carbon fibres are particularly preferred.

In a particularly advantageous embodiment of the invention, the negative electrode comprises an area-based amount of active material in the range from about 1.5 $mg/cm^2$ to 5 $mg/cm^2$.

Preferably, the negative electrode of the invention has a thickness in the range from about 10 to 150 μm.

The invention also relates to a sodium-ion battery comprising at least one negative electrode in contact with a current collector, at least one positive electrode in contact with a current collector, said negative and positive electrodes being separated from one another by an electrolyte, said battery being characterized in that the negative electrode is as defined above.

The positive electrode of a battery according to the invention comprises an active material, optionally an agent conferring electron conductivity and optionally a binder, said positive electrode being capable of reversibly inserting $Na^+$ ions at a potential higher than the operating potential of the negative electrode. As examples of active material, we may mention:
the lamellar fluorophosphates $Na_2TPO_4F$ in which T represents a divalent element selected from Fe, Mn, Co, and Ni, which may be replaced partially with Mg or Zn,
fluorophosphates different from the aforementioned fluorophosphates, said fluorophosphates being selected from $Na_3V_2(PO_4)_2F_3$, $Na_3V_2(PO_4)_3$ and $NaVPO_4F$;

the fluorosulphates NaT'SO$_4$F in which T' represents at least one element selected from Fe, Mn, Co, V and Ni, a proportion of which may be replaced with Mg and a proportion of the sulphate groups SO$_4^{2-}$ may be replaced with the isosteric and isocharge group PO$_3$F$^{2-}$;

the polysulphides Na$_2$S$_n$ (1≤n≤6), and the sodium salts of dimercaptothiadiazole and of dimercaptooxazole;

the dithiocarbarnates Na[CS$_2$NR'R"] in which each of the groups R' and R" represents a methyl, ethyl, or propyl radical, or else R' and R" form a ring (for example pyrrolidine or morpholine).

The current collector of the positive electrode and the current collector of the negative electrode according to the invention consist of a conductive material.

In a particular embodiment, the conductive material of the current collector of the negative electrode according to the invention and the conductive material of the current collector of the positive electrode are metallic materials that may be selected independently of one another, for example from aluminium, copper, a steel, and iron.

In a particular embodiment, the current collector of the negative electrode according to the invention and the current collector of the positive electrode have a thickness in the range from about 15 to 30 μm.

The electrolyte of the battery is a solution of a sodium salt in a solvent.

The sodium salt is preferably selected from the sodium salts of strong acids, such as for example NaClO$_4$, NaBF$_4$, NaPF$_6$, Na$_2$SO$_4$, NaNO$_3$, Na$_3$PO$_4$, Na$_2$CO$_3$ and the sodium salts having a perfluoroalkanesulphonate anion, bis(perfluoroalkylsulphonyl)imides such as sodium bis(trifluoromethanesulphonyl)imide (NaTFSI), bis(perfluoroalkylsuiphonyl)methane or tris(perfluoroalkylsulphonyl)methane. Among such salts, NaClO$_4$, NaPF$_6$ and NaTFSI are particularly preferred.

The solvent may be a liquid solvent, optionally gelled with a polymer, or a polar polymer solvent optionally plasticized with a liquid.

The liquid solvent is preferably a polar aprotic liquid organic solvent selected for example from linear ethers and cyclic ethers, esters, nitriles, nitrated derivatives, amides, sulphones, sulpholanes, alkylsulphamides and partially hydrogenated hydrocarbons. The solvents that are particularly preferred are diethyl ether, dimethoxyethane, glyme, tetrahydrofuran, dioxane, dimethyltetrahydrofuran, methyl or ethyl formate, propylene carbonate, ethylene carbonate, vinylene carbonate or fluoroethylene carbonate, alkyl carbonates (notably dimethyl carbonate, diethyl carbonate and methylpropyl carbonate), butyrolactones, acetonitrile, benzonitrile, nitromethane, nitrobenzene, dimethylformamide, diethylformamide, N-methylpyrrolidone, dimethylsulphone, tetramethylene sulphone, tetramethylene sulphone and tetraalkylsulphonamides having from 5 to 10 carbon atoms.

The polar polymer solvent may be selected from the solvating polymers, crosslinked or not, bearing or not bearing grafted ionic groups. A solvating polymer is a polymer that comprises solvating units containing at least one heteroatom selected from sulphur, oxygen, nitrogen and fluorine. As examples of solvating polymers, we may mention polyethers of linear, comb or block structure, whether or not forming a network, based on poly(ethylene oxide), or copolymers containing the ethylene oxide or propylene oxide unit or allylglycidyl ether, the polyphosphazenes, crosslinked networks based on polyethylene glycol crosslinked with isocyanates or networks obtained by polycondensation and bearing groups that allow the incorporation of crosslinkable groups. We may also mention the block copolymers in which certain blocks carry functions that have redox properties. Of course, the above list is not limiting, and all polymers having solvating properties may be used.

The solvent of the electrolyte may comprise simultaneously an aprotic liquid solvent selected from the aprotic liquid solvents mentioned above and a polar polymer solvent comprising units containing at least one heteroatom selected from sulphur, nitrogen, oxygen and fluorine. As examples of a polar polymer of this kind, we may mention the polymers that mainly contain units derived from acrylonitrile, vinylidene fluoride, N-vinylpyrrolidone or methyl methacrylate. The proportion of aprotic liquid in the solvent may vary from 2% (corresponding to a plasticized solvent) to about 98% (corresponding to a gelled solvent).

In a particular embodiment, each of the electrodes of a battery according to the invention consists of a thin film, said thin film preferably being of thickness less than about 100 μm, and even more preferably of thickness less than about 50 μm. When the electrolyte is a polymer solid electrolyte, it is also in the form of a thin film with a thickness in the range from about 100 to 300 μm. When the electrolyte is a liquid electrolyte, said liquid impregnates a separator in the form of a thin film with a thickness in the range from about 100 to 300 μm.

In a particular embodiment, the electrolyte comprises about 5 vol % of fluoroethylene carbonate.

DETAILED DESCRIPTION

Figure 1:
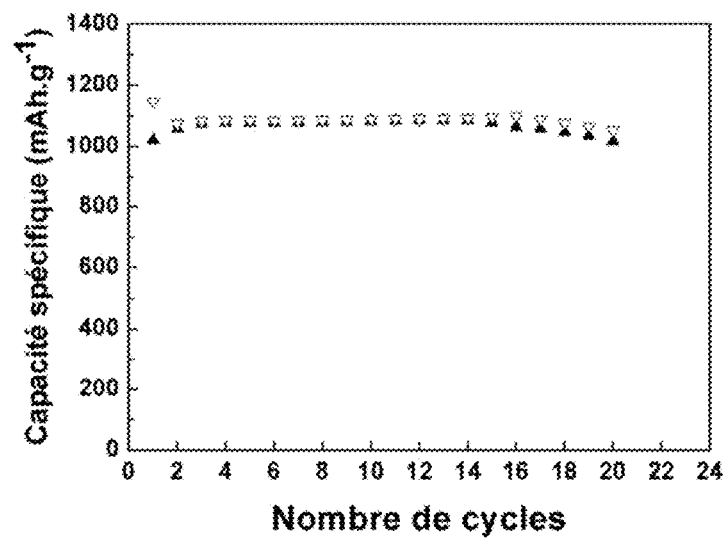
FIG. 1 is a graph from example 3 showing the NiP$_3$ anode has a specific capacity of about 1050 mAh/g and is stable for at least 20 cycles.

The present invention is illustrated by the following examples, but it is not limited to these.

EXAMPLES

The raw materials used in the examples are listed below:
Tin Sn powder, Aldrich, particle size of 10 μm, purity>99%,
Antimony Sb powder, Alfa-Aesar, purity 99.5%, ~325 mesh,
Cobalt Co powder, Aldrich, purity>99.99%, ~100 mesh,
Nickel Ni powder, Acros Organics, purity 99.9%, ~325 mesh,
Iron powder, Alfa-Aesar, purity 99%, ~200 mesh,
Indium In powder, Aldrich, purity 99.99%,
Red phosphorus powder, Aldrich, purity 99%,
Bismuth powder, Fluka, purity 99.9%,
Copper Cu powder, Alpha Aesar, purity 99.9%, 100-325 mesh
Carboxymethylcellulose (CMC) with weight-average molecular weight of 250000 g·mol$^{-1}$ and with degree of substitution of 0.7,
Ethylene carbonate (EC), fluoroethylene carbonate (FEC), vinylidene carbonate (VC), propylene carbonate (PC) and dimethyl carbonate (DMC), battery grade,
Sodium perchlorate NaClO$_4$ Addrich, purity 98%,
Carbon black (NC), Y50A, surface area (BET method)= 66 m$^2$/g,
Vapour grown carbon fibres (VGCF-S), Showa Denko, surface area (BET method)=35 m$^2$/g, diameter of fibres 100 nm.
All the materials were used as received from the manufacturers.

Example 1

Preparation of the Negative Electrode Active Materials of Formula (I) Used According to the Invention When the active material of the invention comprises only the element E2 (x=0 and n=0), it was prepared by fast grinding of element E2 as received from the manufacturers.

When the active material of the invention comprises a mixture of powders of a transition metal M and of an element E2 (M/E2) or a mixture of powders of an element E1 and of an element E2 (E1/E2), it was prepared either by grinding said mixture of powders (mechanosynthesis), or by treatment of said mixture of powders under vacuum and at high temperature in a sealed tube (high-temperature synthesis).

1.1 Preparation of the Negative Electrode Active Materials by Grinding

When the active materials were prepared by grinding, said grinding was carried out in a planetary ball mill sold under the trade name Retsch PM 100 comprising 6 stainless steel bails each of 3 grams and 1 cm diameter. This grinding mill functions by centrifugal motion of the balls, at a speed of up to 600 rev/min.

Under the effect of the centrifugal forces generated by the rotation, the motion of the balls crushes the powders to be ground against the inside wall of the container (which has a volume of 50 cm$^3$). Grinding is then essentially effected by pressure and friction. The combination of the forces of impact and forces of friction thus created guarantees a high and very efficient degree of grinding of the planetary ball mills. Moreover, the duration of grinding depends on the energy developed by the grinding mill and the amount of powder to be ground.

A powder of transition metal M (respectively a powder of element E1) and a powder of element E2 were introduced in stoichiometric proportions into the grinding mill as described above to obtain 1 to 2 grams of powder of active material of formula (I).

The grinding speed was 500 rev/min and grinding was carried out at room temperature without supply of heat.

In order to avoid an excessive increase in temperature, grinding was carried out in several sequences, separated by pauses for cooling the grinding container and the powders that it contains. For this purpose, a series of sequences "10 minutes grinding/10 minutes pause" was employed. The grinding time (including pauses) for obtaining the active material of formula (I) was from 2 to 72 hours using a ratio weight of balls/total weight of powder to be ground in the range from 9 to 18.

The volume occupied by the mixture of powders to be ground was less than ⅓ of the volume of the grinding container.

After grinding as described above, a step of thermal treatment in a sealed tube, under vacuum, at a temperature in the range from 400° C. to 800° C., for 4 to 14 days was in certain cases carried out in order to form the compounds of formula (I) as such, i.e. in the form of alloys.

1.2 Preparation of the Negative Electrode Active Materials by High-temperature Synthesis When preparation of the active materials used according to the invention was carried out by high-temperature synthesis, a mixture of powders of a transition metal M and of an element E2 (M/E2) or a mixture of powders of an element E1 and of an element E2 (E1/E2) was put in a sealed tube and treated under vacuum, at a temperature in the range from 400° C. to 800° C. for a time in the range from 4 to 14 days in order to form the compounds of formula (I) as such, i.e. in the form of alloys.

Table 1 below shows the active material used according to the invention, the type of preparation employed if required (grinding with optionally thermal treatment or treatment in a sealed tube at high temperature), and the parameters of temperature and time used in said preparation.

TABLE 1

| Active substance | Type of preparation | Parameters of temperature and/or time |
|---|---|---|
| SnP$_3$ | Grinding | 60 hours |
| NiP$_3$ | Sealed tube | 700° C., 4 days |
| CuP$_2$ | Grinding | 24 hours |
| CoP$_3$ | Grinding | 24 hours |
| CoSb$_3$ | Grinding then Sealed tube | 48 hours; 750° C., 7 days |
| NiSb$_2$ | Sealed tube | 610° C., 12 days |
| FeSb$_2$ | Sealed tube | 600° C., 5 days |
| Bi$_{0.22}$Sb$_{0.78}$ (x = 0.28) | Grinding | 24 hours |
| Bi$_{0.44}$Sb$_{0.56}$ (x = 0.79) | Grinding | 24 hours |
| GeSn | Grinding | 24 hours |
| In | Grinding | 2 hours |
| Bi | Grinding | 2 hours |

Example 2

Preparation of Negative Electrodes Comprising an Active Material of Formula (I) According to the Invention Electrodes comprising an active material of formula (I) were prepared as follows:

An aqueous suspension comprising water, 300 mg of active material of formula (I) (for $CoSb_3$, $NiSb_2$, $FeSb_2$, $Bi_{0.22}Sb_{0.78}$, $Bi_{0.44}Sb_{0.56}$, GeSn, In and Bi) or 200 mg of active material of formula (I) (for $SnP_3$ and $NiP_3$), carboxymethylcellulose (CMC), carbon black (NC) and optionally vapour grown carbon fibres (VGCF-S) was homogenized for 1 hour at room temperature, in a planetary mixer sold under the trade name Fritsch Pulverisette 7.

Table 2 below shows the amounts by weight of each of the compounds (in %) and the volume of water (in ml) used for formulation of each of the electrodes A1-A10 according to the invention.

TABLE 2

| Electrode | Active substance Type | CMC % | NC % | VGCF-S % | Water ml |
|---|---|---|---|---|---|
| A1 | $SnP_3$ | 63 | 16 | 21 | 0 | 1.2 |
| A2 | $NiP_3$ | 63 | 16 | 21 | 0 | 1.2 |
| A3 | $CoSb_3$ | 70 | 12 | 18 | 0 | 1.3 |
| A4 | $NiSb_2$ | 70 | 12 | 9 | 9 | 1.1 |
| A5 | $FeSb_2$ | 70 | 12 | 9 | 9 | 1.35 |
| A6 | $Bi_{0.22}Sb_{0.78}$ | 70 | 12 | 9 | 9 | 1.3 |
| A7 | $Bi_{0.44}Sb_{0.56}$ | 70 | 12 | 9 | 9 | 1.3 |
| A8 | GeSn | 70 | 12 | 9 | 9 | 1.3 |
| A9 | In | 70 | 12 | 18 | 0 | 1.3 |
| A10 | Bi | 70 | 12 | 18 | 0 | 1.3 |

After said homogenization step, some milliliters of the aqueous suspension were applied by the "doctor blade" method on a copper sheet with thickness of 20 µm used as a current collector, and the assembly obtained was dried at room temperature for 12 hours, then at 100° C. under vacuum for 2 hours to obtain an assembly of negative electrode according to the invention+current collector, said negative electrode according to the invention having a thickness of about 10 to 30 µm. The thickness of the negative electrode was measured by scanning electron microscopy with a microscope with a field effect detector of secondary and backscattered electrons sold under the name Hitachi S4800.

Example 3

Electrochemical Performance of the Negative Electrodes Comprising an Active Material of Formula (I) According to the Invention 3.1 Measurements of the Specific Capacity Half-cell electrochemical tests in a cell of the button type were carried out for each of the electrodes A1 to A10 as prepared above in example 2, using a sodium sheet as counter-electrode, and as electrolyte a solution of sodium perchlorate ($NaClO_4$ 1 mol/l) in PC and 5% FEC (volume ratio PC/FEC=95/5), a separator of the Whatman glass fibre type, and each of the negative electrodes assembled with a current collector as obtained in example 2 above.

The cell of the button type underwent cycles of charging (C)-discharging (D) in different conditions C/n (n being the number of moles of sodium per mole of active material of formula (I) and per hour), between 0.02 V and 1.5 V (0.02 V and 2 V for $Bi_xSb$).

The measurements of specific capacities for the negative electrodes of the invention comprising as active material $NiP_3$, $CoSb_3$, $FeSb_2$ and $Bi_{0.22}Sb_{0.78}$ are presented respectively in the appended FIGS. 1, 2, 3 and 4, in which the specific capacity (in $mAh \cdot g^{-1}$) is a function of the number of cycles with a current regime of C for $NiP_3$, C/2 for $CoSb_3$ and $FeSb_2$, and C/5 for $Bi_{0.22}Sb_{0.78}$. In these figures, the curves with the tilled triangles correspond to the measurements taken during charging and the curves with the empty triangles correspond to the measurements taken during discharge, the calculation being effected relative to the weight of electrode active material of formula (I).

According to FIG. 1, the $NiP_3$ anode has a specific capacity of about 1050 mAh/g and is stable for at least 20 cycles.

Figure 2:
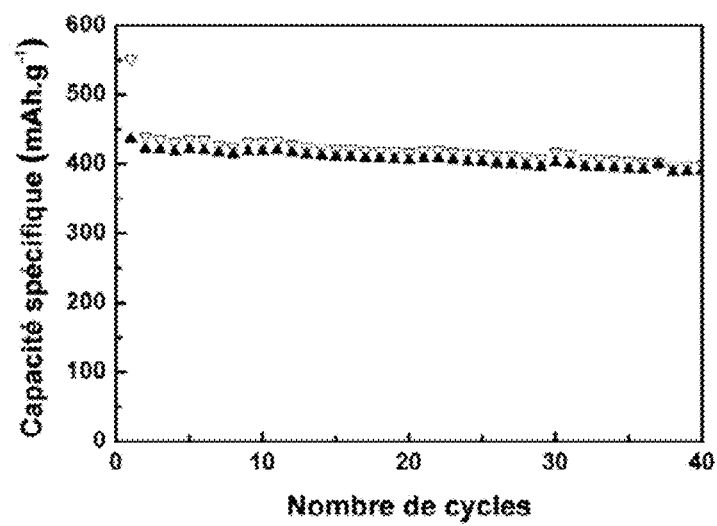
FIG. 2 is a graph from example 3 showing the CoSb$_3$ anode has a specific capacity of about 440 mAh/g and is stable for at least 30 cycles.

According to FIG. 2, the $CoSb_3$ anode has a specific capacity of about 440 mAh/g and is stable for at least 30 cycles.

Figure 3:
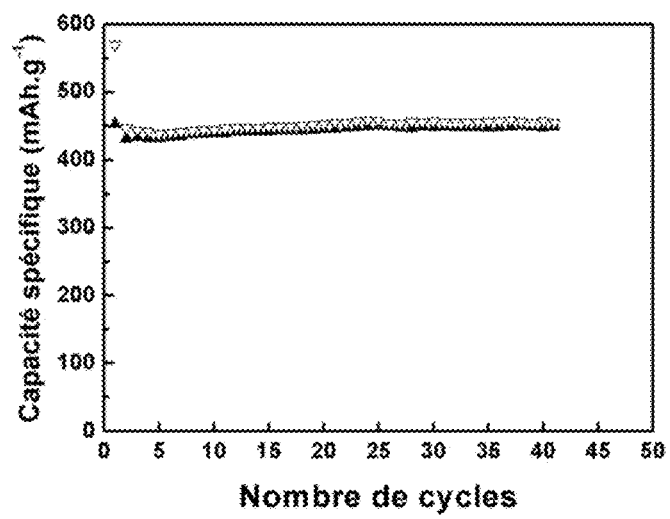
FIG. 3 is a graph from example 3 showing the FeSb$_2$ anode has a specific capacity of about 450 mAh/g and is stable for at least 40 cycles.

According to FIG. 3, the $FeSb_2$ anode has a specific capacity of about 450 mAh/g and is stable for at least 40 cycles.

Figure 4:
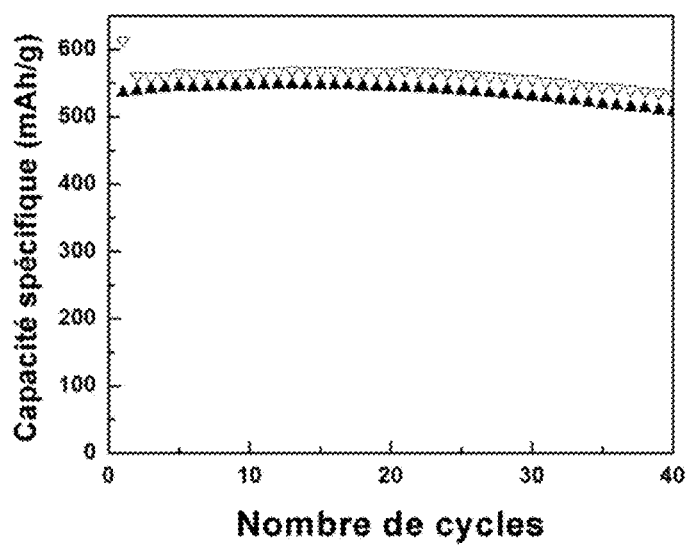
FIG. 4 is a graph from example 3 showing the Bi$_{0.22}$Sb$_{0.78}$ anode has a specific capacity of about 550 mAh/g and is stable for at least 40 cycles.
Figure 5:
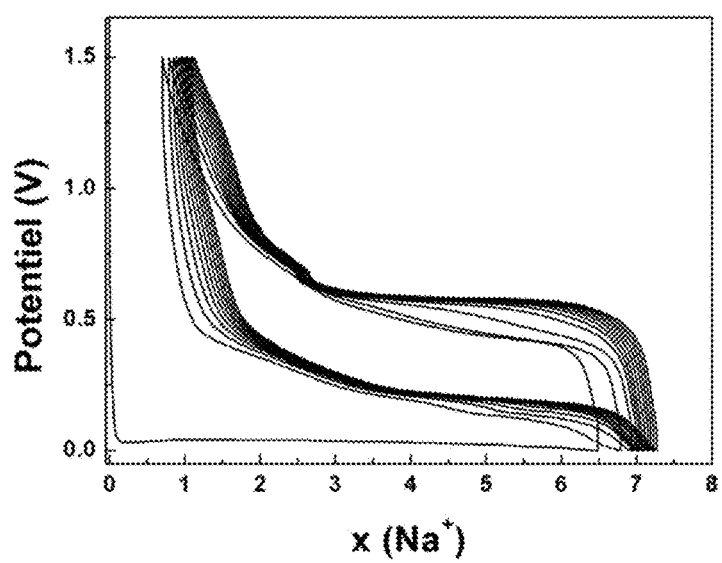
FIG. 5-11 are graphs from example 4 showing respectively the change in potential E (in volts vs Na$^+$/Na) as a function of the equivalent of the number X of Na$^+$ ions inserted during at least the first two charge/discharge cycles for the negative electrodes.
Figure 6:
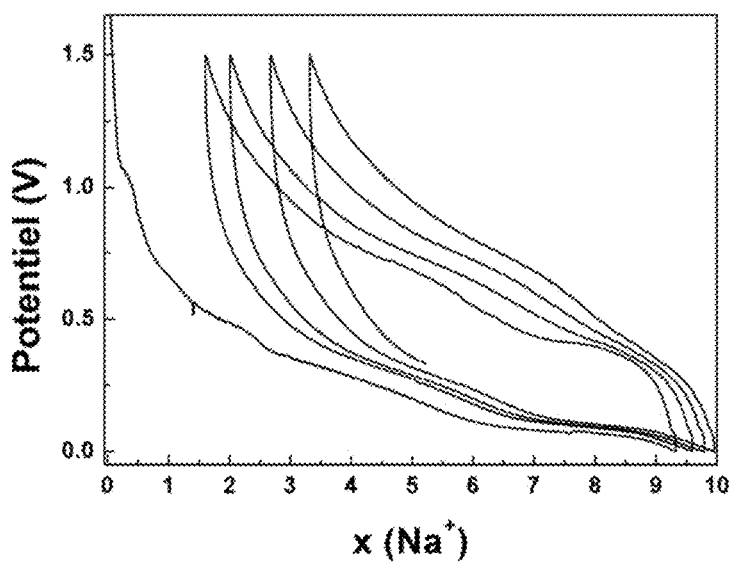
Figure 7:
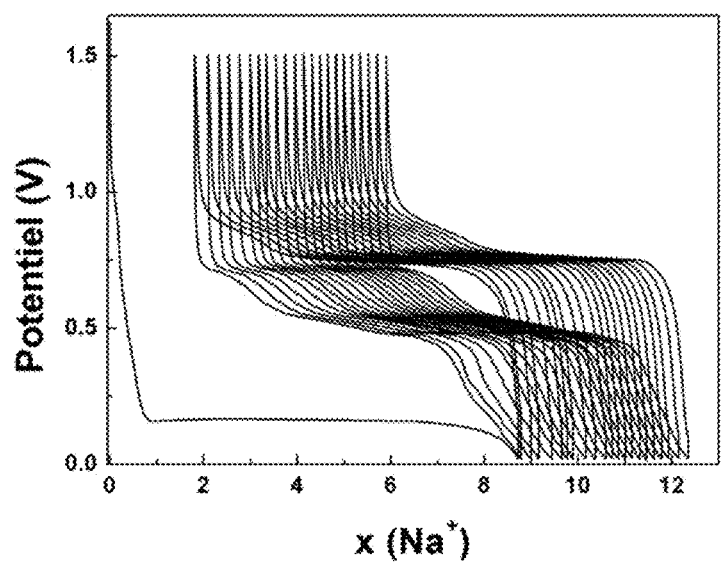
Figure 8:
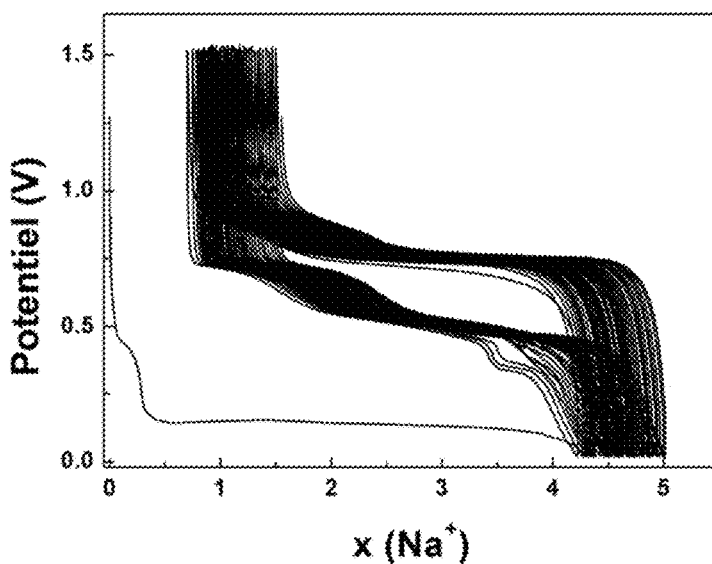
Figure 9:
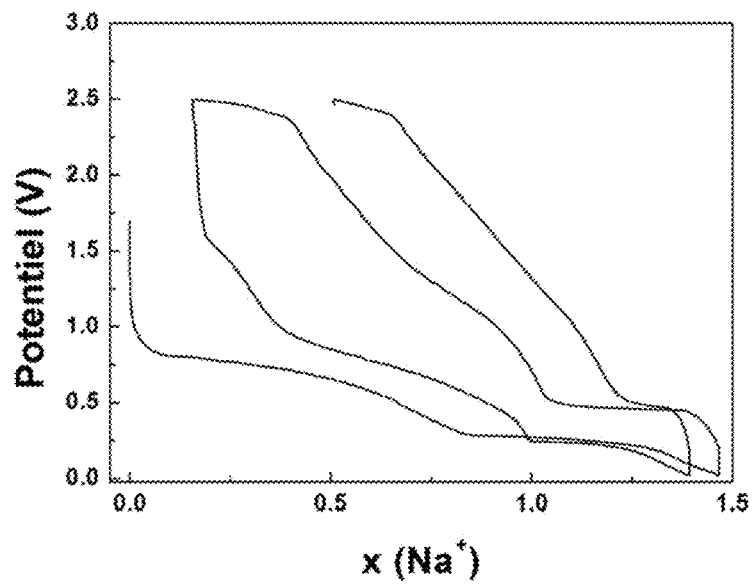
Figure 10:
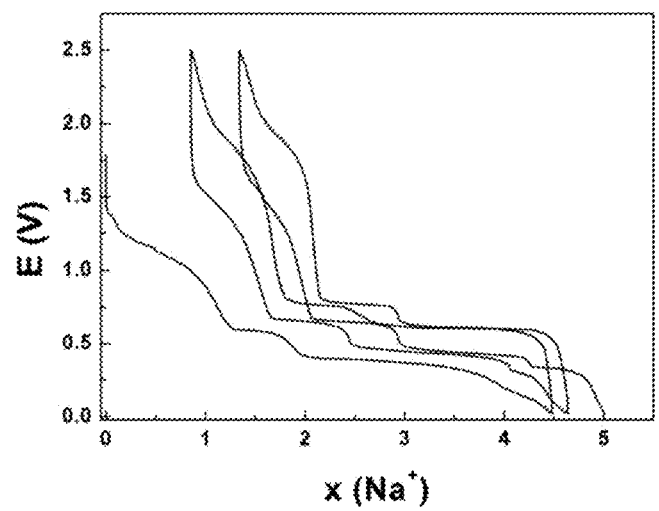
Figure 11:
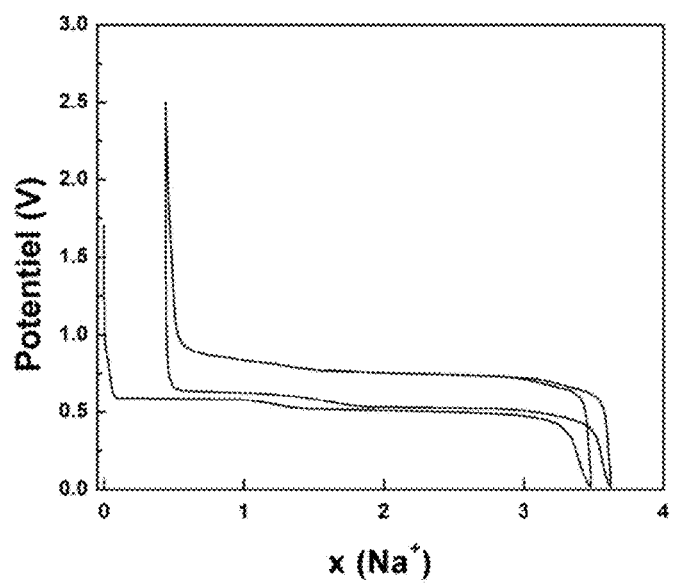

According to FIG. 4, the $Bi_{0.22}Sb_{0.78}$ anode has a specific capacity of about 550 mAh4.5, and is stable for at least 40 cycles.

These results show that the negative electrodes according to the invention have excellent cycling stability both in charging and in discharging.

The measurements of the reversible specific capacities (1st cycle) depending on the regime used, of the reversible volume capacities (1st cycle), of the theoretical specific capacities and of the coulombic efficiencies of the negative electrodes according to the invention are listed in Table 3 below. The coulombic efficiencies presented are those measured beyond the first cycle and while the capacity is stable.

TABLE 3

| Electrode | Active substance | Reversible specific capacity 1st cycle mAh/g at C/n | Theoretical specific capacity | Reversible volume capacity 1st cycle mAh/cm³ | Coulombic efficiency % |
|---|---|---|---|---|---|
| A1 | $SnP_3$ | 866 at C/15 | 1140 | 3680 | 95 |
| A2 | $NiP_3$ | 1050 at C | 1590 | 4600 | 99 |
| A3 | $CoSb_3$ | 440 at C/2 | 569 | 3420 | 97 |
| A4 | $NiSb_2$ | 440 at C/30 | 532 | 3476 | 92 |
| A5 | $FeSb_2$ | 450 at C/2 | 537 | 3690 | 98 |
| A6 | $Bi_{0.22}Sb_{0.78}$ | 550 at C/5 | 570 | 4200 | 96 |
| A7 | $Bi_{0.44}Sb_{0.56}$ | 525 at C/5 | 502 | 3795 | 91 |
| A8 | GeSn | 500 at C/15 | 1050 | 3300 | 97 |
| A9 | In | 265 at C/10 | 350 | 1934 | 89 |
| A10 | Bi | 464 at C/10 | 385 | 4547 | 85 |

According to the results obtained above, we may conclude that the electrodes according to the invention have good electrochemical properties.

3.2 Analysis of Sodium Insertion According to the Cycling Curves

The appended FIGS. 5, 6, 7, 8, 9, 10 and 11 show respectively the change in potential E (in volts vs $Na^+/Na$) as a function of the equivalent of the number X of $Na^+$ ions inserted during at least the first two charge/discharge cycles for the negative electrodes of the invention comprising as active material $NiP_3$, $SnP_3$, $CoSb_3$, $FeSb_2$, in, Bi and $Bi_{0.22}Sb_{0.78}$ with respective current regimes of C/10, C/15, C/2, C/2, C/10, C/10 and C/5. Cycling was performed between 2.5 V (or 1.5 V) and 0 V vs $Na^+/Na^0$, with exchange of the $Na^+$ ion per period of C/n (corresponding to 1 mole of Na exchanged, inserted or extracted in n hour(s)).

FIGS. 5 to 11 show that the negative electrodes according to the invention have good electrochemical performance, which is surprising bearing in mind that passage from $Li^+$ to $Na^+$ is not favourable, neither for ion diffusion, nor for electron conduction since Li loses its electron more easily than Na), nor for the volume expansion generated.

Thus, the performance of the materials cannot be simply deduced from that obtained in an Li-ion battery since it depends on many parameters such as the volume expansion, bond rupture/formation taking place during the various phase transitions, electronic charge transfers, etc.

Comparative Example 4

Figure 12:
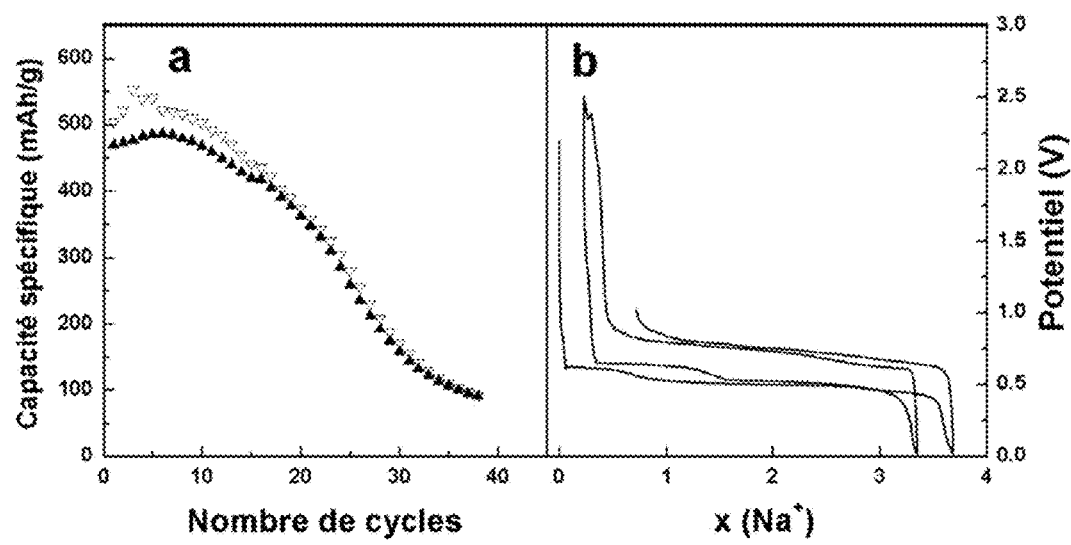
FIG. 12a is a graph from example 4 showing the specific capacity (in mAh·g$^{-1}$) as a function of the number of cycles with a current regime of C/5 for an electrode prepared as described in example 1
FIG. 12b is a graph from example 4 showing the change in potential E (in volts vs Na$^+$/Na) as a function of the equivalent of the number X of Na$^+$ ions inserted during at least the first two charge/discharge cycles.

The appended FIG. 12a shows the specific capacity (in $mAh \cdot g^{-1}$) as a function of the number of cycles with a current regime of C/5 for an electrode prepared as described in example 1 with an active material BiSb (x=1), said electrode therefore not being according to the invention. In this figure, the curve with the filled triangles corresponds to the measurements taken during charging and the curve with the empty triangles corresponds to the measurements taken during discharge, the calculation being performed relative to the weight of active material.

The appended FIG. 12b shows the change in potential E (in volts vs $Na^+/Na$) as a function of the equivalent of the number X of $Na^+$ ions inserted during at least the first two charge/discharge cycles for the negative electrode not according to the invention comprising BiSb as active material with a current regime of C/5.

FIGS. 12a and 12b show that the negative electrode not according to the invention has very poor cycling stability after 10 cycles.

Example 5

Preparation of Other Negative Electrodes Comprising an Active Material of Formula (I) According to the Invention Electrodes comprising an active material of formula I were prepared as follows:

An aqueous suspension comprising water, 300.7 mg of $CoP_3$ active material, or 301.4 mg of $CuP_2$ active material, carboxymethylcellulose (CMC), carbon black (NC) and optionally vapour grown carbon fibres (VGCF-S) was homogenized for 1 hour at room temperature, in a planetary mixer sold under the trade name Fritsch Pulverisette 7.

Table 4 below shows the amounts by weight of each of the compounds (in %) and the volume of water (in ml) used for formulation of each of the electrodes A11 and A12 according to the invention.

TABLE 4

| Electrode | Active substance Type | Active substance % | CMC % | NC % | VGCF-S % | Water ml |
|---|---|---|---|---|---|---|
| A11 | $CoP_3$ | 62.9 | 16 | 10.5 | 10.6 | 1.2 |
| A12 | $CuP_2$ | 70 | 12 | 18 | 0 | 0.95 |

After said homogenization step, some milliliters of the aqueous suspension were applied by the "doctor blade" method on a copper sheet with a thickness of 20 μm used as current collector, and the assembly obtained was dried at room temperature for 12 hours, then at 100° C. under vacuum for 2 hours to obtain an assembly of current collector+negative electrode according to the invention, said negative electrode according to the invention having a thickness of about 10 to 30 μm. Said thickness of the negative electrode was measured by scanning electron microscopy with a microscope with a field effect detector of secondary and backscattered electrons sold under the name Hitachi S4800.

Example 6

Electrochemical Performance of the Negative Electrodes as Prepared in Example 5 and Comprising an Active Material of Formula (I) According to the Invention 6.1 Measurements of Specific Capacity Half-cell electrochemical tests in a cell of the button type were performed for each of the electrodes A11 and A12 as prepared above in example 5, using a sodium sheet as counter-electrode, and as electrolyte a solution of sodium perchlorate ($NaClO_4$ 1 mol/l) in PC and 5% FEC (volume ratio PC/FEC=95/5), a separator of the Whatman glass fibre type, and each of the negative electrodes assembled with a current collector as obtained in example 5 above.

The cell of the button type underwent cycles of charging (C)-discharging (D) in different conditions C/n (n being the number of moles of sodium per mole of active material of formula (I) and per hour), between 0.02 V and 1.5 V.

Figure 13:
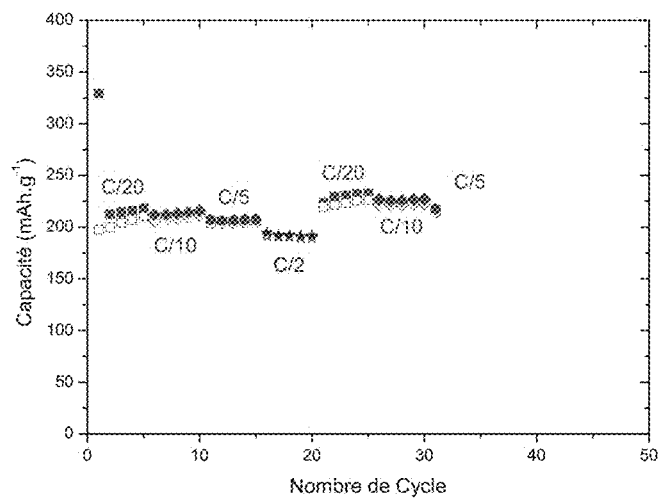
FIG. 13 is a graph from example 6 showing the CoP$_3$ anode has a specific capacity of about 210-230 mAh/g and is stable for at least 30 cycles.
Figure 14:
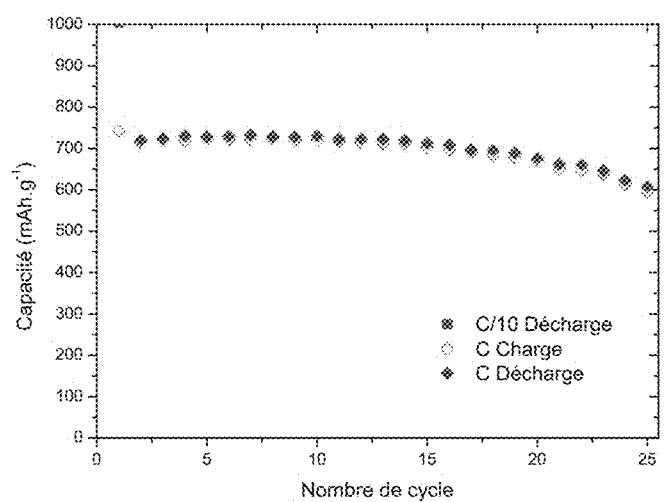
FIG. 14 is a graph from example 6 showing the CuP$_2$ anode has a specific capacity of about 700 mAh/g and is stable for at least 20 cycles.

The measurements of specific capacities for the negative electrodes of the invention comprising $CoP_3$ and $CuP_2$ as active material are presented respectively in the appended FIGS. 13 and 14, in which the specific capacity (in $mAh \cdot g^{-1}$) is a function of the number of cycles with a current regime of C/20 (squares), then C/10 (diamonds), then C/5 (hexagons), then C/2 (stars) for $CoP_3$, and of C (diamonds) for $CuP_2$. In these figures, the curves with the filled squares or the filled diamonds or the filled hexagons or the filled stars correspond to the measurements taken during discharge and the curves with the empty squares or the empty diamonds or the empty hexagons or the empty stars correspond to the measurements taken during charging, the calculation being performed relative to the weight of electrode active material of formula (f).

According to FIG. 13, the $CoP_3$ anode has a specific capacity of about 210-230 mAh/g and is stable for at least 30 cycles.

According to FIG. 14, the $CuP_2$ anode has a specific capacity of about 700 mAh/g and is stable for at least 20 cycles.

The measurements of the reversible specific capacities (1st cycle) depending on the regime used, of the reversible volume capacities (1st cycle), of the theoretical specific capacities and of the coulombic efficiencies of the negative electrodes according to the invention are listed in Table 5 below. The coulombic efficiencies presented are those measured beyond the first cycle and while the capacity is stable.

TABLE 5

| Electrode | Active substance | Reversible specific capacity 1st cycle mAh/g at C/n | Theoretical specific capacity | Reversible volume capacity 1st cycle mAh/cm³ | Coulombic efficiency % |
|---|---|---|---|---|---|
| A11 | CoP$_3$ | 220 C/20 | 1590 | 968 | 98% |
| A12 | CuP$_2$ | 743.03 C | 1280 | 3195 | 99% |

According to the results obtained above, we may conclude that the electrodes according to the invention have good electrochemical properties.

6.2 Analysis of Sodium Insertion According to the Cycling Curves

Figure 15:
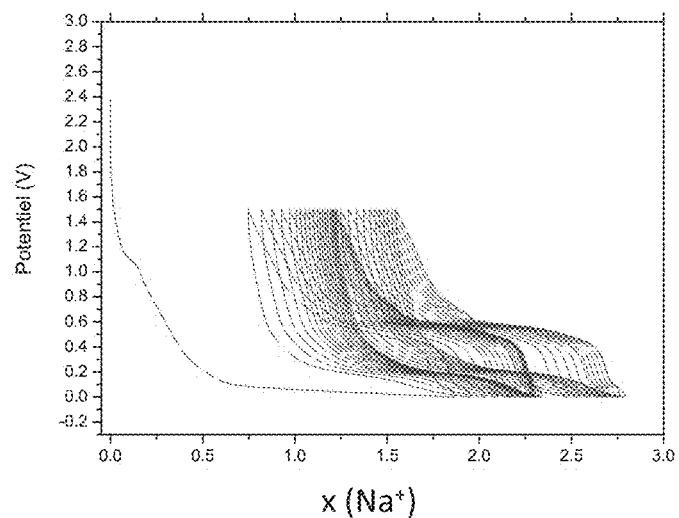
FIGS. 15 and 16 are graphs from example 6 showing respectively the change in potential E (in volts vs Na$^+$/Na) as a function of the equivalent of the number X of Na$^+$ ions inserted during at least the first two charge/discharge cycles for the negative electrodes of the invention.
Figure 16:
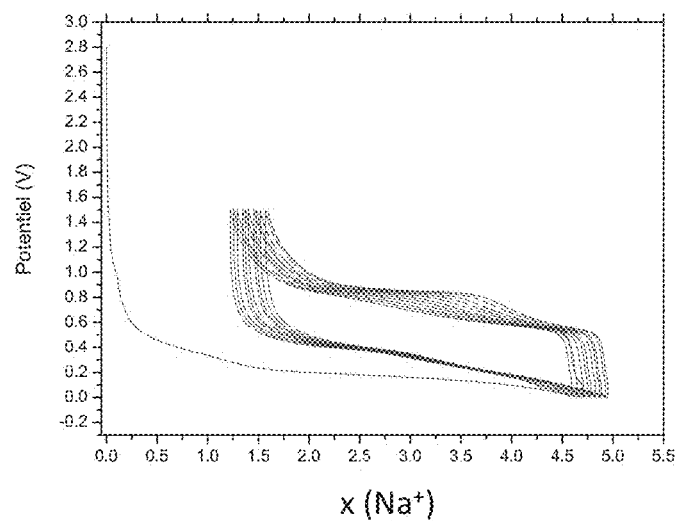

The appended FIGS. 15 and 16 show respectively the change in potential E (in volts vs Na$^+$/Na) as a function of the equivalent of the number X of Na$^+$ ions inserted during at least the first two charge/discharge cycles for the negative electrodes of the invention comprising CoP$_3$ as active material with current regimes of C/20, then C/10, then C/5 and then C/2, and CuP$_2$ as active material with current regimes of C/10 and then C. Cycling was carried out between 1.5 V and 0 V vs Na$^+$/Na$^0$, with exchange of the Na$^+$ ion per period of C/n (corresponding to 1 mole of Na exchanged, inserted or extracted in n hour(s)).

FIGS. 15 and 16 show that the negative electrodes according to the invention have good electrochemical performance, which is surprising bearing in mind that passage from Li$^+$ to Na$^+$ is not favourable, neither for ion diffusion, nor for electron conduction (since Li loses its electron more easily than Na), nor for the volume expansion generated.

Thus, the performance of the materials cannot be simply deduced from that obtained in an Li-ion battery since it depends on many parameters such as volume expansion, bond rupture/formation taking place during the various phase transitions, electronic charge transfers, etc.

The invention claimed is:

1. A sodium-ion battery comprising:
   at least one negative electrode in contact with a current collector; and
   at least one positive electrode in contact with a current collector,
   wherein said electrodes are separated from one another by an electrolyte,
   wherein said negative electrode comprises as a negative active material, a precursor compound of sodium alloy(s) responding to the following formula:

$$M_nE1_xE2 \tag{I}$$

in which:
   M is a transition metal selected from the group consisting of Co, Cu, Ni and Fe;
   E1 and E2 are elements selected from the group consisting of In, Bi, Ge, Sn, Sb and P;
   the values of n and x are such that the compound of formula (I) is electronically neutral;
   n=0 and x≠0; or n≠0 and x=0; with the following conditions:
   when n=0 and x≠0, E1 and E2 are different from one another and are selected from the group consisting of In, Bi, Ge, Sn, Sb and P, with x such that 0.1≤x≤2; it being understood that when x=1 and E1 (respectively E2) is Sn, E2 (respectively E1) is different from Sb;
   when n≠0 and x=0, E2 is selected from the group consisting of In, Bi, Ge, Sn, Sb and P, with n such that 0.1≤n≤3; it being understood that when n=2 and M is Cu, E2 is different from Sb and when n=6/5 and M is Cu, E2 is different from Sn,
   wherein the precursor compound of sodium alloy(s) responds to the following formula(Ib-1):

$$Bi_xSb \tag{Ib-1}$$

in which:
   the value of x is such that the compound of formula (Ib-1) is electronically neutral;
   x is such that 0.1≤x<1.

2. The sodium-ion battery according to claim 1, wherein the precursor compound of sodium alloy(s) responds to the following formula (Ia):

$$M_nE1_xP \tag{Ia}$$

in which:
   M is a transition metal selected from the group consisting of Co, Cu, Ni and Fe;
   E1 is an element selected from the group consisting of In, Bi, Ge, Sn and Sb;
   the values of n and x are such that the compound of formula (Ia) is electronically neutral;
   n=0 and x≠0; or n≠0 and x=0;
   with the following conditions:
   when n=0 and x≠0, x is such that 0.1≤x≤1;
   when n≠0 and x=0, n is such that 0.1≤x≤3.

3. The sodium-ion battery according to claim 1, wherein the precursor compound of sodium alloy(s) responds to the following formula (Ib):

$$M_nE1_xSb \tag{Ib}$$

in which:
   M is a transition metal selected from the group consisting of Co, Cu, Ni and Fe;
   E1 is an element selected from the group consisting of In, Bi, Ge, Sn and P;
   the values of n and x are such that the compound of formula (Ib) is electronically neutral;
   n=0 and x≠0; or n≠0 and x=0;
   with the following conditions:
   when n=0 and x≠0, x is such that 0.1≤x≤1;
   when n≠0 and x=0, n is such that 0.1≤x≤3.

4. The sodium-ion battery according to claim 1, wherein the precursor compound of sodium alloy(s) is SnGe.

5. The sodium-ion battery according to claim 1, wherein the negative electrode comprises:
   (i) 45 to 75% of said precursor compound of sodium alloy(s) responding to the formula (I),
   (ii) 0 to 30% of a binder, and
   (iii) 0 to 30% of an agent conferring electron conductivity, the percentages being expressed by weight relative to the total weight of the negative electrode.

6. The sodium-ion battery according to claim 1, wherein the negative electrode comprises:
   (i) 55 to 75% of said precursor compound of sodium alloy(s) responding to the formula (I),
   (ii) 10 to 25% of a binder, and
   (iii) 15 to 25% of an agent conferring electron conductivity, the percentages being expressed by weight relative to the total weight of the negative electrode.

7. The sodium-ion battery according to claim 5, wherein the negative electrode comprises:
   (i) 60 to 67% of the precursor compound of sodium alloy(s) responding to said formula (Ia),
   (ii) 12 to 20% of a binder, and
   (iii) 18 to 25% of an agent conferring electron conductivity, the percentages being expressed by weight relative to the total weight of the negative electrode.

8. The sodium-ion battery according to claim 5, wherein the binder is selected from the group consisting of carboxymethylcellulose (CMC), polyvinylidene fluoride (PVDF), styrene/butadiene copolymer (SBR) and mixtures thereof.

9. The sodium-ion battery according to claim 5, wherein the agent conferring electron conductivity is selected from the group consisting of carbon black, vapour grown carbon fibres, carbon nanotubes, carbon SP and mixtures thereof.

* * * * *